United States Patent
Kondrad et al.

(10) Patent No.: US 12,068,007 B2
(45) Date of Patent: Aug. 20, 2024

(54) METHOD, APPARATUS AND COMPUTER PROGRAM PRODUCT FOR SIGNALING INFORMATION OF A MEDIA TRACK

(71) Applicant: Nokia Technologies Oy, Espoo (FI)

(72) Inventors: Lukasz Kondrad, Munich (DE); Lauri Aleksi Ilola, Munich (DE); Emre Baris Aksu, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/655,270

(22) Filed: Mar. 17, 2022

(65) Prior Publication Data

US 2022/0335979 A1    Oct. 20, 2022

Related U.S. Application Data

(60) Provisional application No. 63/176,415, filed on Apr. 19, 2021.

(51) Int. Cl.
  *H04N 21/262*   (2011.01)
  *G11B 27/36*    (2006.01)
  *H04N 21/81*    (2011.01)

(52) U.S. Cl.
  CPC .......... *G11B 27/36* (2013.01); *H04N 21/816* (2013.01)

(58) Field of Classification Search
  CPC ................ G11B 27/36; H04N 21/816; H04N 21/23412; H04N 21/234318; H04N 21/26291; H04N 21/4348; H04N 21/44012; H04N 21/4586; H04N 21/8146; H04N 21/8402; H04N 21/85406
  See application file for complete search history.

(56) References Cited

U.S. PATENT DOCUMENTS

2003/0046691 A1 *  3/2003  Nakagawa  .........  H04N 21/8153
                                                  725/38
2003/0123542 A1 *  7/2003  Lee  ......................  H04N 21/658
                                                  375/E7.006

(Continued)

OTHER PUBLICATIONS

Bryan et al., "JavaScript Object Notation (JSON) Patch", RFC 6902, Internet Engineering Task Force (IETF), Apr. 2013, pp. 1-18.

(Continued)

*Primary Examiner* — Hien L Duong
(74) *Attorney, Agent, or Firm* — Harrington & Smith

(57) ABSTRACT

Various embodiments provide an apparatus, a method, and a computer program product. The apparatus includes at least one processor; and at least one non-transitory memory including computer program code; wherein the at least one memory and the computer program code are configured to, with the at least one processor, cause the apparatus at least to perform: define or utilize file format syntax elements to indicate samples comprising at least one of: one or more description documents, wherein the one or more description documents comprise 3 dimensional information; or one or more updates to at least one description document of the one or more description documents; and define or utilize the file format syntax elements to indicate a relationship between samples containing the one or more description document and update information to the samples.

17 Claims, 11 Drawing Sheets

(56) References Cited

U.S. PATENT DOCUMENTS

| | | | |
|---|---|---|---|
| 2004/0024898 A1* | 2/2004 | Wan | H04N 21/8543 |
| | | | 707/E17.058 |
| 2016/0371265 A1 | 12/2016 | Aksu et al. | |
| 2020/0066022 A1* | 2/2020 | Leong | G06F 3/0482 |
| 2020/0107051 A1* | 4/2020 | Oh | H04N 21/2362 |
| 2020/0381022 A1 | 12/2020 | Ilola et al. | |
| 2021/0099773 A1 | 4/2021 | Bouazizi et al. | |
| 2021/0105451 A1 | 4/2021 | Oyman et al. | |
| 2021/0195263 A1* | 6/2021 | Garcia Sanchez | ........................ |
| | | | H04N 21/8456 |
| 2022/0094941 A1* | 3/2022 | Kondrad | H04N 19/136 |
| 2022/0247991 A1* | 8/2022 | Takahashi | H04N 19/597 |
| 2022/0337919 A1* | 10/2022 | Yip | H04N 21/8543 |
| 2022/0406062 A1* | 12/2022 | Katsumata | H04N 5/765 |
| 2023/0222726 A1* | 7/2023 | Kiyama | H04N 21/23412 |
| | | | 345/419 |

OTHER PUBLICATIONS

"Information Technology—Coding of Audio-Visual Objects—Part 12: ISO Base Media File Format", ISO/IEC 14496-12, Fifth edition, Dec. 15, 2015, 248 pages.

"Procedures for standard development, test scenarios and reference software for ISO/IEC 23090-14 (MPEG-I Scene Description)", Systems, ISO/IEC JTC 1/SC 29/WG 3, N00121, Jan. 2021, 29 pages.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information technology—Generic coding of moving pictures and associated audio information: Video", Series H: Audiovisual and Multimedia Systems Infrastructure of audiovisual services—Coding of moving video, ITU-T Recommendation H.262, Feb. 2020, 220 pages.

"Information technology—Universal coded character set (UCS)", ISO/IEC 10646, Sixth edition, Dec. 2020, 9 pages.

"IEEE 802.11", Wikipedia, Retrieved on Mar. 23, 2022, Webpage available at : https://en.wikipedia.org/wiki/IEEE_802.11.

"Information Technology—Coding of Audio-Visual Objects—Part 15: Advanced Video Coding (AVC) File Format", ISO/IEC 14496-15, First edition, Apr. 15, 2004, 29 pages.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual and Multimedia Systems, Infrastructure of audio-visual services—Coding of moving Video, Recommendation ITU-T H.264, Apr. 2017, 812 pages.

International Search Report and Written Opinion received for corresponding Patent Cooperation Treaty Application No. PCT/IB2022/052406, dated Jun. 15, 2022, 15 pages.

"Draft Technologies under Consideration on Scene Description for MPEG Media", WG 03, MPEG Systems, ISO/IEC JTC 1/SC 29/WG03/N0xxx, Apr. 2021, pp. 1-49.

* cited by examiner

METHOD, APPARATUS AND COMPUTER PROGRAM PRODUCT FOR SIGNALING INFORMATION OF A MEDIA TRACK

TECHNICAL FIELD

The examples and non-limiting embodiments relate generally to providing signaling information that allow to differentiate between samples of a media track that contains description documents and patch documents.

BACKGROUND

It is known to provide scene description formats for enabling immersive augmented reality and six degrees of freedom experiences.

SUMMARY

An example apparatus includes at least one processor; and at least one non-transitory memory including computer program code; wherein the at least one memory and the computer program code are configured to, with the at least one processor, cause the apparatus at least to perform: define or utilize file format syntax elements to indicate samples comprising at least one of: one or more description documents, wherein the one or more description documents comprise 3 dimensional information; or one or more updates to at least one description document of the one or more description documents; and define or utilize the file format syntax elements to indicate a relationship between samples containing the one or more description document and update information to the samples.

The example apparatus may further include, wherein the relationship indicates the at least one description document to which updates are to be applied.

The example apparatus may be further caused to: mark samples comprising the one or more description documents as a sync sample; and mark samples comprising update information and no description documents as non sync samples.

The example apparatus may be further caused to: define or utilize a group description box comprising information about characteristics of sample groups; define a plurality of sample group description entries, wherein at least one first grouping sample, of the plurality of sample group description entries, comprise the one or more description document, and wherein at least one second grouping sample, of the plurality of sample group description entries, comprises a patch document, wherein the patch document comprises updates to the at least one description document; and signal the plurality of sample group description entries, wherein the plurality of sample group description entries allows to differentiate between sample of media track that comprises the one or more description document and the patch document.

The example apparatus may be further caused to define a sync sample group to identify a sync sample of a specific type.

The example apparatus may further include, wherein, when the sync sample group is given for a specific type of sync sample, samples comprising the specific sync type are marked by the sync sample group.

The example apparatus may be further caused to: extend the plurality of sample group description entries to comprise an update mode, wherein at least one first grouping sample, of the plurality of sample group description entries, comprises a the one or more description documents, and at least one second grouping sample, of the plurality of sample group description entries, comprises a patch document, and wherein the patch document comprises changes to the at least one description document; and signal the extended plurality of sample group description entries to indicate to which samples of a media track the patch document applies.

The example apparatus may further include, wherein the apparatus is further caused to define the update mode, and wherein the update mode indicates how a sample updates a scene, and wherein an update of the sample is associated with a latest sample in a decoding order when the update mode is set to '0', and wherein the update to a sample is associated with latest sync sample in decoding order when the update mode is set to '1'.

The example apparatus may further include, wherein the apparatus is further caused to define an auxiliary information type and an auxiliary information type parameter to identify an auxiliary sample data, wherein the auxiliary sample data identified by the auxiliary information type and the auxiliary information parameter provides information on to which sample in the media track the patch document is applied.

The example apparatus may further include, wherein samples that contain the one or more description document comprises a sample size information of an auxiliary sample information size box The example apparatus may further include, wherein the sample size information size comprises zero to indicate samples that do not comprise associated auxiliary information.

The example apparatus may further include, wherein the auxiliary sample data comprises a sample difference for indicating a sample number of a sample to be updated by using the patch document.

The example apparatus may further include, wherein the sample difference comprises an integer providing a difference between the sample number to be updated and the sample comprising the sample difference.

The example apparatus may further include, wherein the apparatus is further caused to define a configuration box, and wherein a sample entry comprises the configuration box when the media file brand comprises a graphics language transmission format (gltf).

The example apparatus may further include, wherein the media track comprises an ISOBMFF media track.

The example apparatus may further include, wherein the description document comprises a graphics language transmission format (gltf).

The example apparatus may further include, wherein the patch document comprises a java script object notation (JSON) patch document.

The example apparatus may further include, wherein the 3 dimensional information describes a 3 dimensional scene or comprises a 3 dimensional scene information.

An example method includes: defining or utilizing file format syntax elements to indicate samples comprising at least one of: one or more description documents, wherein the one or more description documents comprise 3 dimensional information; or one or more updates to at least one description document of the one or more description documents; and defining or utilizing the file format syntax elements to indicate a relationship between samples containing the one or more description document and update information to the samples.

The example method may further include, wherein the relationship indicates the at least one description document to which updates are to be applied.

The example method may further include: marking samples comprising the one or more description documents as a sync sample; and marking samples comprising update information and no description documents as non sync samples.

The example method may further include: defining or utilizing a group description box comprising information about characteristics of sample groups; defining a plurality of sample group description entries, wherein at least one first grouping samples, of the plurality of sample group description entries, comprise the one or more description document, and wherein at least one second grouping samples, of the plurality of sample group description entries, comprises a patch document, wherein the patch document comprises updates to the at least one description document; and signaling the plurality of sample group description entries, wherein the plurality of sample group description entries allows to differentiate between sample of media track that comprises the one or more description document and the patch document.

The example method may further include defining a sync sample group to identify a sync sample of a specific type.

The example method may further include, wherein, when the sync sample group is given for a specific type of sync sample, samples comprising the specific sync type are marked by the sync sample group.

The example method may further include: extending the plurality of sample group description entries to comprise an update mode, wherein at least one first grouping sample, of the plurality of sample group description entries, comprises a the one or more description documents, and at least one second grouping sample, of the plurality of sample group description entries, comprises a patch document, and wherein the patch document comprises changes to the at least one description document; and signaling the extended plurality of sample group description entries to indicate to which samples of a media track the patch document applies.

The example method may further include defining the update mode, wherein the update mode indicates how a sample updates a scene, and wherein an update of the sample is associated with a latest sample in a decoding order when the update mode is set to '0', and wherein the update to a sample is associated with latest sync sample in decoding order when the update mode is set to '1'.

The example method may further include, further comprising defining an auxiliary information type and an auxiliary information type parameter to identify an auxiliary sample data, wherein the auxiliary sample data identified by the auxiliary information type and the auxiliary information parameter provides information on to which sample in the media track the patch document is applied.

The example method may further include, wherein samples that contain the one or more description document comprises a sample size information of an auxiliary sample information size box The example method may further include, wherein the sample size information size comprises zero to indicate samples that do not comprise associated auxiliary information.

The example method may further include, wherein the auxiliary sample data comprises a sample difference for indicating a sample number of a sample to be updated by using the patch document.

The example method may further include, wherein the sample difference comprises an integer providing a difference between the sample number to be updated and the sample comprising the sample difference.

The example method may further include defining a configuration box, and wherein a sample entry comprises the configuration box when the media file brand comprises a graphics language transmission format (gltf).

The example method may further include, wherein the media track comprises an ISOBMFF media track.

The example method may further include, wherein the description document comprises a graphics language transmission format (gltf).

The example method may further include, wherein the patch document comprises a java script object notation (JSON) patch document.

The example method may further include, wherein the 3 dimensional information describes a 3 dimensional scene or comprises a 3 dimensional scene information.

Another example apparatus includes: at least one processor; and at least one non-transitory memory including computer program code; wherein the at least one memory and the computer program code are configured to, with the at least one processor, cause the apparatus at least to perform: define or utilize a sample box to indicate samples containing a description document as a sync sample, wherein the description document comprise 3 dimensional information; define or utilize a group description box comprising information about characteristics of sample groups; define a plurality of sample group description entries, wherein at least one first grouping sample, of the plurality of sample group description entries, comprises the description document, and wherein at least one second grouping sample, of the plurality of sample group description entries, comprises a patch document, wherein the patch document comprises changes to the description document; and signal the plurality of sample group description entries, wherein the plurality of sample group description entries allow to differentiate between sample of media track that comprises the description document and the patch document.

The another example apparatus may further include, wherein the apparatus is further caused to define a sync sample group to identify a sync sample of a specific type.

The another example apparatus may further include, wherein, when a sync sample group is given for a specific type of sync sample, samples comprising the specific sync type are marked by the sync sample group.

The another example apparatus may further include, wherein the media track comprises an ISOBMFF media track.

The another example apparatus may further include, wherein the description document comprises a graphics language transmission format (gltf).

The another example apparatus may further include, wherein the patch document comprises a java script object notation (JSON) patch document.

The another example apparatus may further include, wherein the sample box comprises a SyncSampleBox.

The another example apparatus may further include, wherein the 3 dimensional information describes a 3 dimensional scene or comprises a 3 dimensional scene information.

A yet another example apparatus includes: at least one processor; and at least one non-transitory memory including computer program code; wherein the at least one memory and the computer program code are configured to, with the at least one processor, cause the apparatus at least to perform: extend a plurality of sample group description entries to comprise an update mode, wherein at least one first grouping sample, of the plurality of sample group description entries, comprising a description document and at least one second grouping sample, of the plurality of sample group description entries, comprising a patch document, and wherein the description document comprise 3 dimensional information, and wherein the patch document comprises changes to the description document; and signal the extended plurality of sample group description entries to indicate to which samples of a media track the patch document applies.

The yet another example apparatus may be further include, wherein the apparatus is further caused to define the update mode, and wherein the update mode indicates how a sample updates a scene, and wherein an update of the sample is associated with a latest sample in a decoding order when the update mode is set to '0', and wherein the update to a sample is associated with latest sync sample in decoding order when the update mode is set to '1'.

The yet another example apparatus may further include, wherein the apparatus is further caused to define an auxiliary information type and an auxiliary information type parameter to identify an auxiliary sample data, and wherein the auxiliary sample data identified by the auxiliary information type and auxiliary information parameter provides information on to which sample in the media track the patch document is applied.

The yet another example apparatus may further include, wherein samples that contain the description document comprises a sample size information of an auxiliary sample information size box, wherein the sample size information size comprises zero to indicate samples that do not comprise associated auxiliary information.

The yet another example apparatus may further include, wherein the auxiliary sample data comprises a sample difference for indicating a sample number of a sample to be updated by using the patch document.

The yet another example apparatus may further include, wherein the sample difference comprises an integer providing a difference between the sample number to be updated and the sample comprising the sample difference.

The yet another example apparatus may further include, wherein the apparatus is further caused to define a configuration box, and wherein a sample entry comprises the configuration box when the media file brand comprises a graphics language transmission format (gltf).

The yet another example apparatus may further include, wherein the media track comprises an ISOBMFF media track.

The yet another example apparatus may further include, wherein the description document comprises a graphics language transmission format (gltf).

The yet another example apparatus may further include, wherein the patch document comprises a java script object notation (JSON) patch document.

The yet another example apparatus may further include, wherein the 3 dimensional information describes a 3 dimensional scene or comprises a 3 dimensional scene information.

Another example method includes: defining or utilizing a sample box to indicate samples containing a description document as a sync sample, wherein the description document comprise 3 dimensional information; defining or utilizing a group description box comprising information about characteristics of sample groups; defining a plurality of sample group description entries, wherein at least one first grouping sample, of the plurality of sample group description entries, comprises the description document, and wherein at least one second grouping sample, of the plurality of sample group description entries, comprises a patch document, wherein the patch document comprises changes to the description document; and signaling the plurality of sample group description entries, wherein the plurality of sample group description entries allow to differentiate between sample of media track that comprises the description document and the patch document.

The another example method may further include to defining a sync sample group to identify a sync sample of a specific type.

The another example method may further include, wherein, when a sync sample group is given for a specific type of sync sample, samples comprising the specific sync type are marked by the sync sample group.

The another example method may further include, wherein the media track comprises an ISOBMFF media track.

The another example method may further include, wherein the description document comprises a graphics language transmission format (gltf).

The another example method may further include, wherein the patch document comprises a java script object notation (JSON) patch document.

The another example method may further include, wherein the sample box comprises a SyncSampleBox.

The another example apparatus may further include, wherein the 3 dimensional information describes a 3 dimensional scene or comprises a 3 dimensional scene information.

A yet another example method includes: extending a plurality of sample group description entries to comprise an update mode, wherein at least one first grouping sample, of the plurality of sample group description entries, comprising a description document and at least one second grouping sample, of the plurality of sample group description entries, comprising a patch document, and wherein the description document comprise 3 dimensional information, and wherein the patch document comprises changes to the description document; and signaling the extended plurality of sample group description entries to indicate to which samples of a media track the patch document applies.

The yet another example method may further include defining the update mode, wherein the update mode indicates how a sample updates a scene, and wherein an update of the sample is associated with a latest sample in a decoding order when the update mode is set to '0', and wherein the update to a sample is associated with latest sync sample in decoding order when the update mode is set to '1'.

The yet another example method may further include defining an auxiliary information type and an auxiliary information type parameter to identify an auxiliary sample data, wherein the auxiliary sample data identified by the auxiliary information type and auxiliary information parameter provides information on to which sample in the media track the patch document is applied.

The yet another example method may further include, wherein samples that contain the description document comprises a sample size information of an auxiliary sample information size box, wherein the sample size information size comprises zero to indicate samples that do not comprise associated auxiliary information.

The yet another example method may further include, wherein the auxiliary sample data comprises a sample difference for indicating a sample number of a sample to be updated by using the patch document.

The yet another example method may further include, wherein the sample difference comprises an integer providing a difference between the sample number to be updated and the sample comprising the sample difference.

The yet another example method may further include defining a configuration box, and wherein a sample entry comprises the configuration box when the media file brand comprises a graphics language transmission format (gltf).

The yet another example method may further include, wherein the media track comprises an ISOBMFF media track.

The yet another example method may further include, wherein the description document comprises a graphics language transmission format (gltf).

The yet another example method may further include, wherein the patch document comprises a java script object notation (JSON) patch document.

The yet another example method may further include, wherein the 3 dimensional information describes a 3 dimensional scene or comprises a 3 dimensional scene information.

An example non-transitory computer readable medium includes program instructions for causing an apparatus to perform at least the following: defining or utilizing file format syntax elements to indicate samples containing one or more description documents, wherein the one or more description documents comprise 3 dimensional information, and updates to at least one description document of the one or more description documents defining or utilizing the file format syntax elements to indicate a relationship between samples containing the one or more description document and update information to the samples.

The example computer readable medium further includes, wherein the computer readable medium comprises a non-transitory computer readable medium.

The example computer readable medium further includes, wherein the computer readable medium further causes the apparatus to perform the methods as claimed in any of the claims 18 to 34.

The yet another example computer readable medium further include, wherein the 3 dimensional information describes a 3 dimensional scene or comprises a 3 dimensional scene information.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 2:
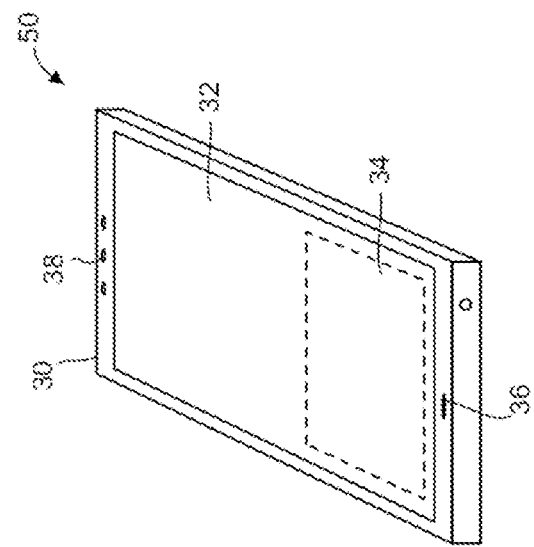
FIG. 2 shows schematically a user equipment suitable for employing embodiments of the examples described herein.

The following acronyms and abbreviations that may be found in the specification and/or the drawing figures are defined as follows:
3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network
ACC accuracy
AI artificial intelligence
AIoT AI-enabled IoT
a.k.a. also known as
AMF access and mobility management function
AVC advanced video coding
CABAC context-adaptive binary arithmetic coding
CDMA code-division multiple access
CE core experiment
CNN convolutional neural network
CU central unit
DASH dynamic adaptive streaming over HTTP
DCT discrete cosine transform
DSP digital signal processor
DU distributed unit
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
FL federated learning
glTF graphics language transmission format
gNB (or gNodeB) base station for 5G/NR, for example, a node providing NR user plane and control plane protocol terminations towards the UE, and connected via the NG interface to the 5GC GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
ISO International Organization for Standardization
ISOBMFF ISO base media file format
ITU International Telecommunication Union
ITU-T ITU Telecommunication Standardization Sector
JSON JavaScript Object Notation
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MIME Multipurpose Internet Mail Extensions
MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
NAL network abstraction layer
NDU NN compressed data unit
ng or NG new generation
ng-eNB or NG-eNB new generation eNB
NN neural network
NNEF neural network exchange format
NNR neural network representation
non-iid non independent and non identically distributed
NR new radio (5G radio)
N/W or NW network
ONNX Open Neural Network exchange
PB protocol buffers
PC personal computer
PDA personal digital assistant
PDCP packet data convergence protocol
PHY physical layer
PID packet identifier
PLC power line communication
PSNR peak signal-to-noise ratio
RAM random access memory
RAN radio access network
RFC request for comments
RFID radio frequency identification
RLC radio link control
RRC radio resource control
RRH remote radio head
RU radio unit
Rx receiver
SDAP service data adaptation protocol
SGD stochastic gradient descent
SGW serving gateway
SMF session management function
SMS short messaging service
st(v) null-terminated string encoded as UTF-8 characters as specified in ISO/IEC 10646
SVC scalable video coding
S1
TCP-IP transmission control protocol-internet protocol
TDMA time divisional multiple access
trak TrackBox
TS transport stream
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
VCM video coding for machines
WLAN wireless local area network
X2 interconnecting interface between two eNodeBs in LTE network
Xn interface between two NG-RAN nodes Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data,' 'content,' 'information,' and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium,' which refers to a non-transitory physical storage medium (e.g., volatile or non-volatile memory device), can be differentiated from a 'computer-readable transmission medium,' which refers to an electromagnetic signal.

A method, apparatus and computer program product are provided in accordance with an example embodiment in order to provide signaling information that allows to differentiate between samples of a media track that contains file format documents and file format patch documents.

Figure 1:
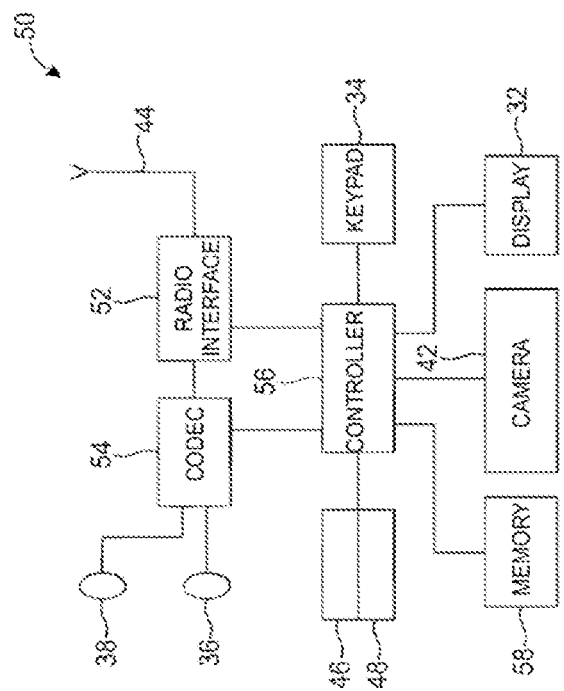
FIG. 1 shows schematically an electronic device employing embodiments of the examples described herein.

The following describes in detail suitable apparatus and possible mechanisms for signaling information that allow to differentiate between samples of a media track that contains file format documents and file format patch documents. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving, or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The apparatus 50 may, for example, be a mobile terminal or user equipment of a wireless communication system, a sensor device, a tag, or a lower power device. However, it would be appreciated that embodiments of the examples described herein may be implemented within any electronic device or apparatus which may signal information that allow to differentiate between samples of a media track that contains file format documents and file format patch documents.

The apparatus 50 may comprise a housing 30 for incorporating and protecting the device. The apparatus 50 may further comprise a display 32, for example, in the form of a liquid crystal display, a light emitting diode display, an organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data, video data, and/or may also store instructions for implementation on the controller 56. The controller 56 may further be connected to codec circuitry 54 suitable for carrying out coding and/or decoding of audio, image and/or video data or assisting in coding and/or decoding carried out by the controller.

The apparatus 50 may further comprise a card reader 48 and a smart card 46, for example, a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
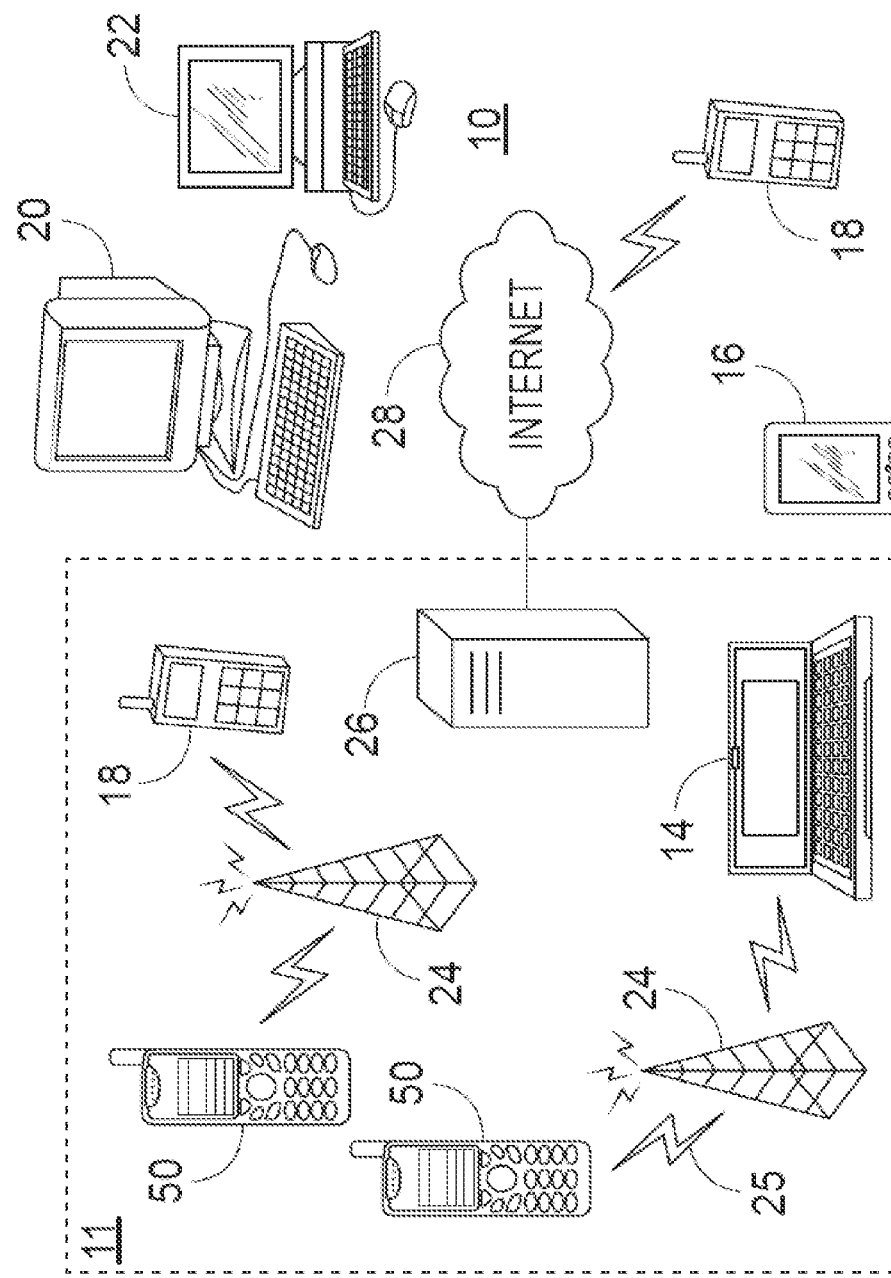
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network, and the like), a wireless local area network (WLAN) such as defined by any of the IEEE 802.x standards, a Bluetooth® personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the Internet 28. Connectivity to the Internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle, or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called internet of things (IoT) devices. The IoT may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the IoT. In order to utilize the Internet, the IoT devices are provided with an IP address as a unique identifier. IoT devices may be provided with a radio transmitter, such as WLAN or Bluetooth transmitter or an RFID tag. Alternatively, the IoT devices may have access to an IP-based network via a wired network, such as an Ethernet-based network or a power-line connection (PLC).

The devices/systems described in FIGS. 1 to 3 enable signaling of information of a media track.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can decompress the compressed video representation back into a viewable form, or into a form that is suitable as an input to one or more algorithms for analysis or processing. A video encoder and/or a video decoder may also be separate from each other, for example, need not form a codec. Typically, encoder discards some information in the original video sequence in order to represent the video in a more compact form (example, at a lower bitrate).

Typical hybrid video encoders, for example, many encoder implementations of ITU-T H.263 and H.264, encode the video information in two phases. Firstly pixel values in a certain picture area (or 'block') are predicted, for example, by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
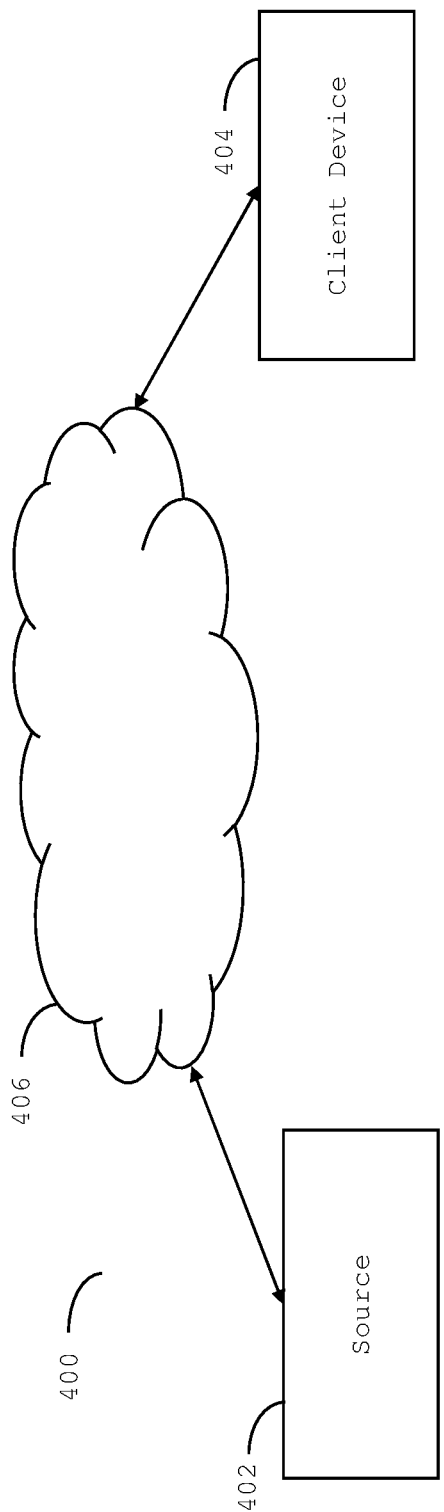
FIG. 4 illustrates a system configured to support streaming of media data from a source to a client device.

FIG. 4 depicts an example of such a system 400 that includes a source 402 of media data and associated metadata. The source may be, in one embodiment, a server. However, the source may be embodied in other manners if so desired. The source is configured to stream the media data and associated metadata to a client device 404. The client device may be embodied by a media player, a multimedia system, a video system, a smart phone, a mobile telephone or other user equipment, a personal computer, a tablet computer, or any other computing device configured to receive and decompress the media data and process associated metadata. In the illustrated embodiment, media data and metadata are streamed via a network 406, such as any of a wide variety of types of wireless networks and/or wireline networks. The client device is configured to receive structured information containing media, metadata and any other relevant representation of information containing the media and the metadata and to decompress the media data and process the associated metadata (e.g. for proper playback timing of decompressed media data).

Figure 5:
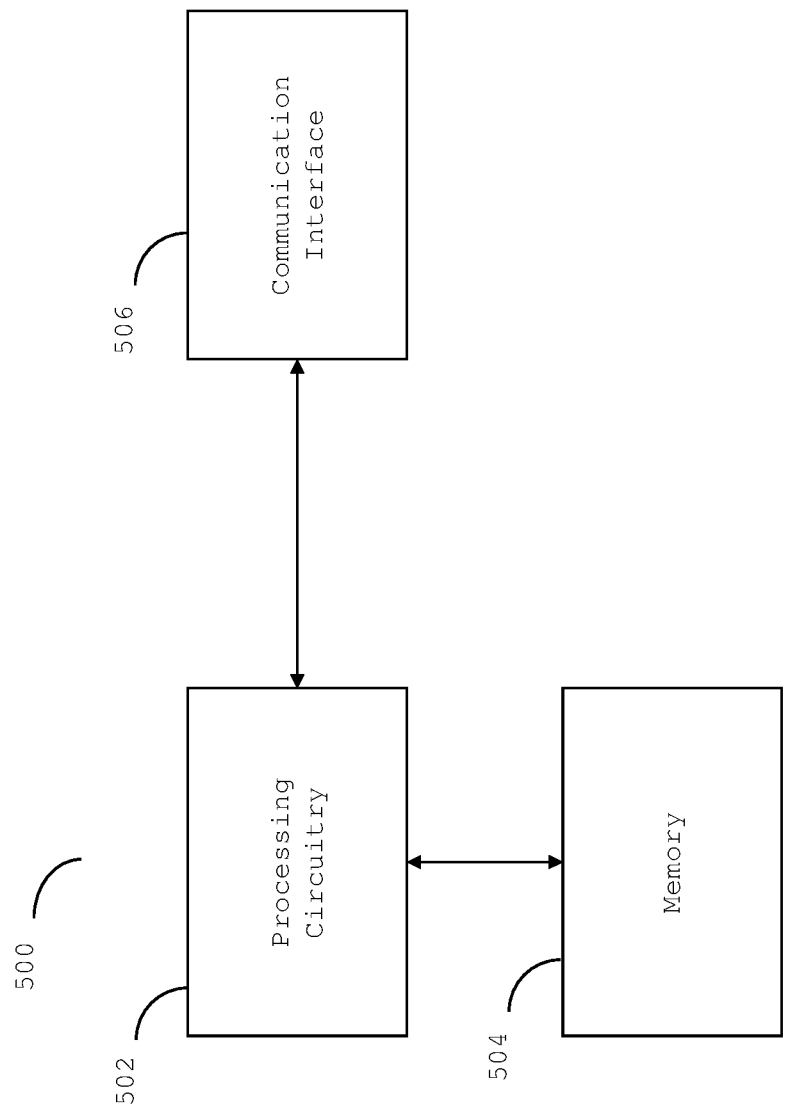
FIG. 5 is a block diagram of an apparatus that may be specifically configured in accordance with an example embodiment.

An apparatus 500 is provided in accordance with an example embodiment. In one embodiment, the apparatus of FIG. 5 may be embodied by a source, for example, the source 402, such as a file writer which, in turn, may be embodied by a server, that is configured to stream a compressed representation of the media data and associated metadata. In an alternative embodiment, the apparatus may be embodied by the client device 404, such as a file reader which may be embodied, for example, by any of the various computing devices described above. In either of these embodiments and as shown in FIG. 5, the apparatus of an example embodiment includes, is associated with or is in communication with a processing circuitry 502, one or more memory devices 504, a communication interface 506, and optionally a user interface.

The processing circuitry 502 may be in communication with the memory device 504 via a bus for passing information among components of the apparatus 500. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 500 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single 'system on a chip.' As such, in some cases, a chip or chipset may constitute means for performing one or more operations for providing the functionalities described herein.

The processing circuitry 502 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 502 may be configured to execute instructions stored in the memory device 504 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 506 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 500 may optionally include a user interface that may, in turn, be in communication with the processing circuitry 502 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

Scene description formats are used for enabling immersive AR and 6DoF experiences. glTF is an example format that may be used for delivery of 3D and volumetric assets. glTF is further described in following paragraphs.

GLTF

The GL transmission format (glTF) is a JSON based rendering application programming interface agnostic runtime asset delivery format. glTF bridges the gap between 3D content creation tools and modern 3D applications by providing an efficient, extensible, interoperable format for the transmission and loading of 3D content.

glTF assets consist of JSON files and supporting external data. Specifically, a glTF asset is represented by:
- A JSON-formatted file (.gltf) containing a full scene description: node hierarchy, materials, cameras, as well as descriptor information for meshes, animations, and other constructs
- Binary files (.bin) containing geometry and animation data, and other buffer-based data.
- Image files (.jpg, .png) for textures The JSON formatted file (.gltf) includes information about the binary files that describes how they may be used when uploaded to GPU with minimal processing. This makes the glTF particularly well suitable for runtime delivery, as the assets may be directly copied into GPU memory for the rendering pipeline, without further transcoding or conversions.

Assets defined in other formats, such as images, may be stored in external files referenced via universal resource identifier (URI), stored side-by-side in GLB container, or embedded directly into the JSON using data URIs and base64 encoding.

glTF has been designed to allow extensibility. The initial base specification supports a number of feature sets, however, there are still opportunities for growth and improvement. glTF defines a mechanism that allows the addition of both general-purpose and vendor-specific extension.

JSON Patch defines a JSON patch document structure for expressing a sequence of operations to apply to a JSON document. Example of defined operations are 'add', 'remove', 'replace', 'move', 'copy', or 'test'. Other operations may be considered as an error.

File Format

Carriage formats for glTF JSON document and JSON patch documents may be defined as follows:

In an example, glTF JSON document may be defined as a timed data by extending ISOBMFF. A brand 'gltf' is used to signal the presence of tracks carrying samples with glTF JSON documents. The track containing the samples is identified by track handler type with 4CC 'text' and a sample entry format with 4CC 'stxt'. The mime_format field of the sample entry would indicate multipurpose internet mail extensions (MIME) 'model/gltf+json'. In an embodiment, the 'model/gltf+json' indicates that the samples include glTF JSON.

In another example, a glTF JSON document may be defined as a non-timed data. A brand 'glti' is used to signal the presence of items carrying a glTF JSON document with resource type 'model/gltf+json'.

In an example, JSON patch documents may be defined as timed data by extending ISOBMFF. A brand 'scen' could be used to signal the presence of tracks carrying samples of JSON patch documents. The track containing the samples is identified by track handler type with 4CC 'text' and a sample entry format with 4CC 'stxt'. The mime format field of the sample entry would indicate with MIME 'application/json-patch+json'. In an embodiment, the 'application/json-patch+json' indicates that the samples include JSON patch documents.

Figure 6:
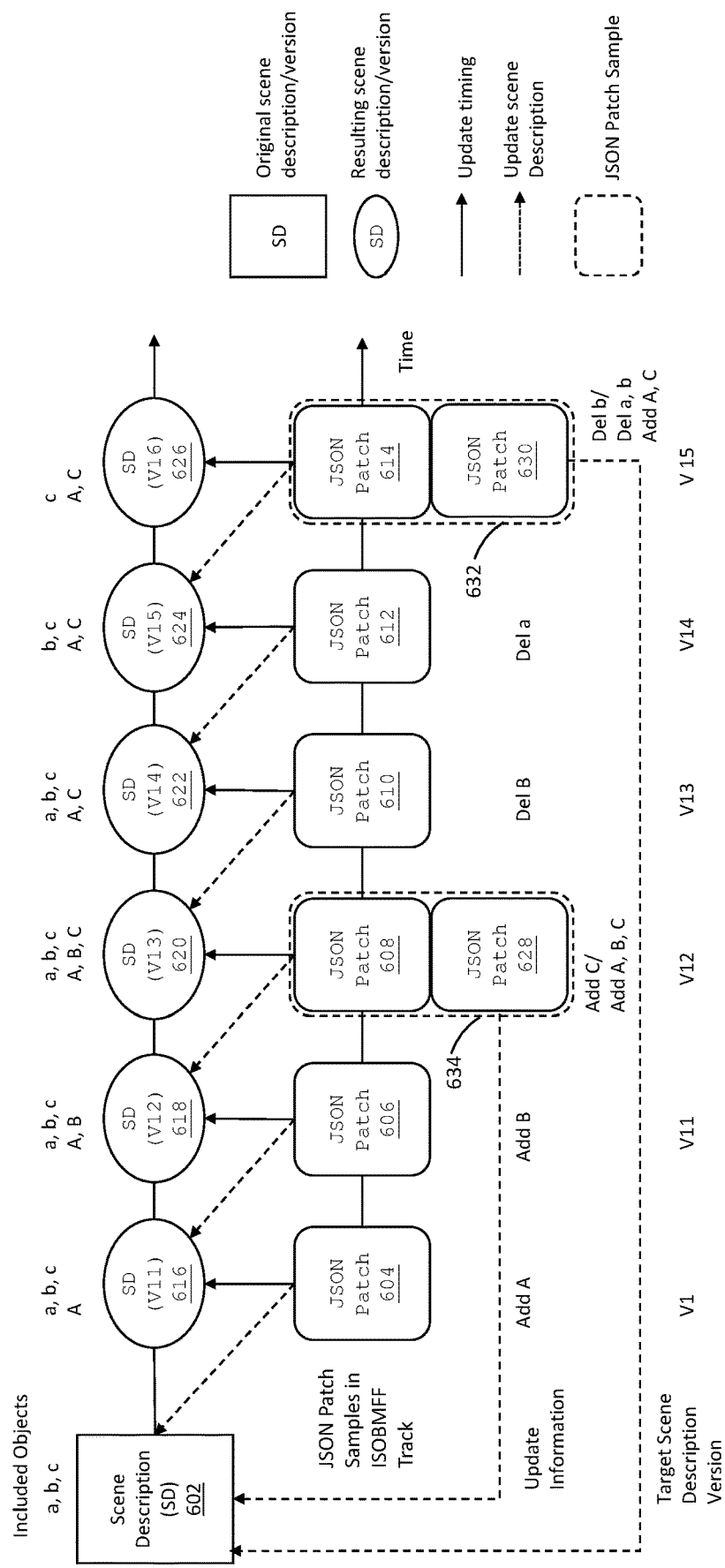
FIG. 6 illustrates random access support by using the update information for an original scene description, in accordance with an embodiment.
Figure 7:
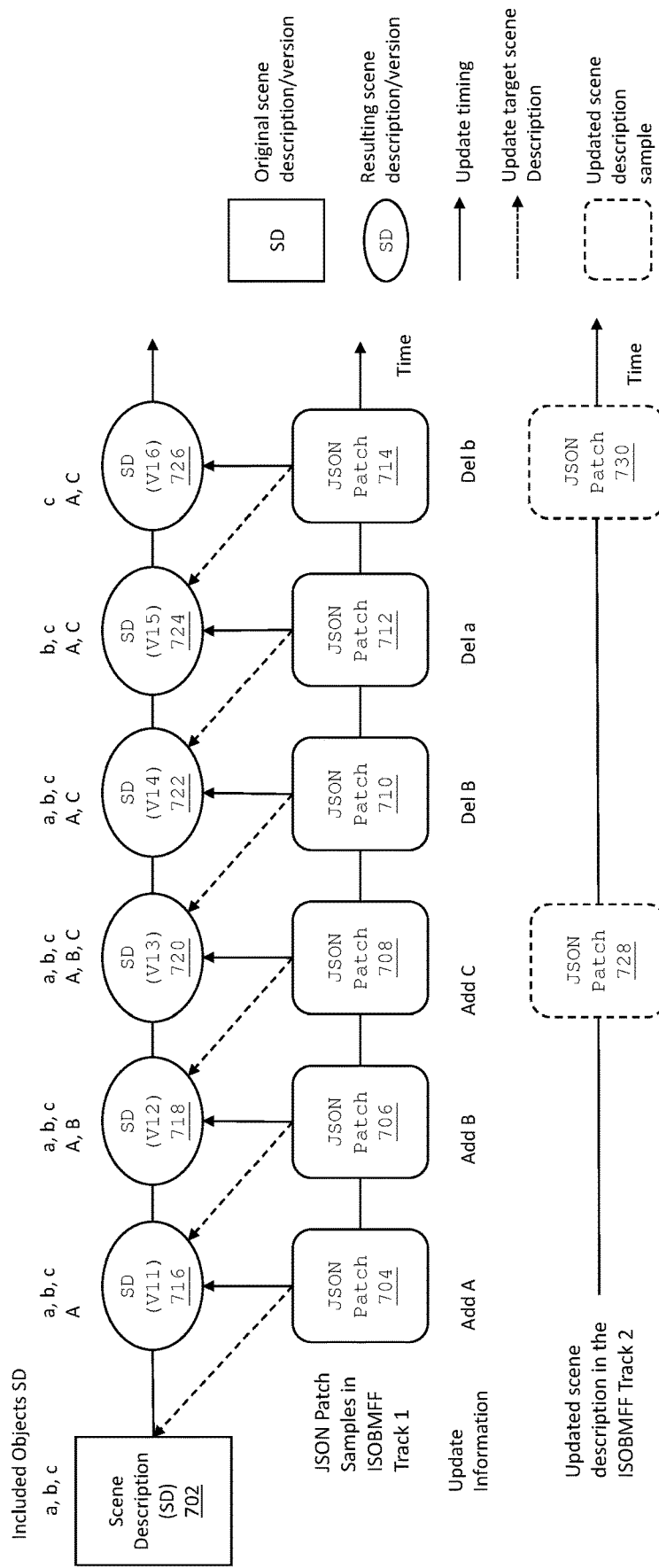
FIG. 7 illustrates random access support by using an updated scene description, in accordance with an embodiment.

Based on the above, technology under consideration for a scene description discusses two example options, as described in FIG. 6 and FIG. 7, for enabling random access support.

Referring to FIG. 6, it illustrates random access support by using the update information for an original scene description, in accordance with an embodiment. FIG. 6 is shown to include original scene description (SD) 602, a JSON patch 604, a JSON patch 606, a JSON patch 608, a JSON patch 610, a JSON patch 612, and a JSON patch 614 are JSON patches that include an update information to a current version of a scene description (SD), for example, an SD 616, an SD 618, an SD 620, an SD 622, an SD 624, and an SD 626. A JSON patch 628 and a JSON patch 630 include an update information to an original scene description, for example, the SD 602.

In an embodiment, JSON patch documents, also referred to as JSON patches, for example, the JSON patch 604, the JSON patch 606, the JSON patch 608, the JSON patch 610, the JSON patch 612, and the JSON patch 614 are JSON patches that reference a closest early scene description and describe changes against the latest scene description and JSON patch documents, for example, the JSON patch 628 and the JSON patch 630 are JSON patches that reference an original scene description and describe the changes against the original scene description.

As shown in FIG. 6 the original scene description (SD) 602 includes objects 'a, b, c'. The JSON patch 604 applies an update information 'Add A' to add an object 'A' to the current scene description, which in this example is also the original scene description (SD) 602. This results in the current SD 616, which includes objects 'a, b, c, A'. Similarly, update information may be sequentially applied to other current versions of a scene description (e.g. the SD 618, the SD 620, the SD 622, the SD 624, and the SD 626) via respective JSON patches or JSON patch samples (e.g. the JSON patch 606, the JSON patch 608 or a JSON patch sample 632, the JSON patch 610, the JSON patch 612, and the JSON patch 614 or a JSON patch sample 634). As shown in FIG. 6, this results in the current scene descriptions the SD 618, the SD 620, the SD 622, the SD 624, and the SD 626 to include objects 'a, b, c, A, B'; 'a, b, c, A, B, C'; 'a, b, c, A, C'; 'b, c, A, C'; and 'c, A, C' respectively.

Referring to FIG. 7, it illustrates random access support by using an updated scene description. FIG. 7 is shown to include an original scene description (SD) 702, a JSON patch 704, a JSON patch 706, a JSON patch 708, a JSON patch 710, a JSON patch 712, and a JSON patch 714 are JSON patches that include an update information to a current version of a scene description (SD), for example, an SD 716, an SD 718, an SD 720, an SD 722, an SD 724, and an SD 726. A JSON patch 728 and a JSON patch 730 include an update information to an original scene description, for example, the SD 702.

As shown in FIG. 7 the original scene description SD 702 includes objects 'a, b, c'. The JSON patch 704 applies an update information 'Add A' to add an object 'A' the current scene description, which in this example is also the original scene description SD 702. This results in the current SD 716, which includes objects 'a, b, c, A'. Similarly, update information may be sequentially applied to other current versions of a scene description (e.g. the SD 718, the SD 720, the SD 722, the SD 724, and the SD 726) via respective JSON patches (e.g. the JSON patch 706, the JSON patch 708, the JSON patch 710, the JSON patch 712, and the JSON patch 714). As shown in FIG. 7, this results in the current scene descriptions the SD 718, the SD 720, the SD 722, the SD 724, and the SD 726 to include objects 'a, b, c, A, B'; 'a, b, c, A, B, C'; 'a, b, c, A, C'; 'b, c, A, C'; and 'c, A, C' respectively.

The JSON patch 728 and the JSON patch 730 provide updated scene description sample that provide cumulative information from all partial updates. An example JSON patch 728 contains information of the JSON patch 704, the JSON patch 706, and the JSON patch 708. Track containing the JSON patch 728 and the JSON patch 730 may be used to perform random access by a client.

Scene Description separates a glTF JSON documents as samples of one track and JSON patch documents as samples of another track. It would be preferable to have the both documents as samples of the same track. Also, it may be more advantageous to allow a content producer to decide how and when the JSON patch document is signaled and to which version of the scene description it is applied. For example, the JSON patch may be applied to a previous version of the scene description, or the JSON patch may be applied always to the original version of the scene description. This result in a problem on how to identify content of a sample in a track, whether it is glTF JSON document or JSON patch document, and when a sample contains JSON patch documents, how to determine to which version of the scene description the JSON patch should be applied to.

Having the information as two tracks cause duplication of not only information in a file format but as well additional information on a system level, e.g. extra information in a DASH media presentation description (MPD) document. A DRM and encryption may set further challenges with the multi-track encapsulation approach.

An embodiment provides a signaling information that allow to differentiate samples of an ISOBMFF track that contains glTF JSON document and JSON patch documents.

Another embodiment provides a signaling information that allow to indicate to which samples of a ISOBMFF track JSON patch document should be applied to. In an embodiment, a JSON patch document may be applied to another JSON patch document that are finally applied to the glTF JSON document.

In an embodiment, a sample is a sample in a track of ISOBMFF. In this embodiment, the sample may include a glTF JSON document or a JSON patch document. The glTF JSON document may include a version of scene description. The JSON patch document may by applied on a given a version of a scene description (e.g. a current version of a glTF JSON document). When a JSON patch document is applied to a version of a glTF JSON document a new glTF JSON document is created, e.g. a new version of scene description is created.

Yet another embodiment provides a signaling information that would allow to include more than one glTF JSON document or JSON patch document in a sample. In an embodiment, when there are more than one glTF JSON document in a sample, a new MIME type may be defined to indicate how to interpret a sample.

In an embodiment, following syntax and/or semantics may be used for providing signaling information that allows to differentiate between samples of a ISOBMFF track that contains glTF JSON document and JSON patch documents:

Utilize SyncSampleBox 'stss' as defined in ISO/IEC 14496-12. Indicate samples containing glTF JSON document as a sync sample and do not indicate the JSON patch documents as sync samples.

```
class SyncSampleEntry( ) extends VisualSampleGroupEntry ('glsy')
{
    bit(2)          reserved        =   0;
    unsigned        int(6)          sync_sample_type;
}
``` sync_sample_type may be a type that identifies a valid sync sample

Utilize SampleGroupDescriptionBox 'sgpd'. This description table gives information about the characteristics of sample groups. Define two new SampleGroupDescriptionEntry one for grouping samples containing glTF JSON document and other for grouping samples containing JSON patch document.

abstract class GlTFSampleGroupEntry ( ) extends SampleGroupDescriptionEntry ('gltf'){ } abstract class GlTFUpdateSampleGroupEntry ( ) extends SampleGroupDescriptionEntry ('gltu'){ }

Since sync samples can be of different types in one track (e.g. samples providing update to the original SD in FIG. 6 and samples providing the updated SD in FIG. 7) a sync sample grouping may be defined to identify the sync samples of a specific type. If a sample group is given for a specific type of sync sample, then samples (if any) containing that type of sync sample are marked by the group.

In an embodiment, following syntax and/or semantics may be used for providing signaling information that allow to indicate to which samples of a ISOBMFF track JSON patch document apply.

Extend sample grouping entry defined in previous paragraphs to following:

```
abstract class GlTFUpdateSampleGroupEntry ( ) extends SampleGroupDescriptionEntry ('gltu'){
    unsigned int(8) update_mode;
}
``` update_mode indicates how the samples update a scene, and when it is set to 0, the update of each sample is with respect to a latest sync sample in decoding order. An update of each sample is with respect to the latest samples in decoding order, when update_mode is set to 1. Other values of update_mode may also be specified.

In an embodiment, when the update_mode is set to 0 the sample update corresponds to using JSON patches, that include an update information to an original scene description, for example, using the JSON patches 728 and 730 as explained in FIG. 7. The sample update corresponds to using JSON patches, that include an update information to a current scene description, for example, the JSON patches 704, 706, 708, 710, 712, and 714, when the update_mode is set to 1.

Utilize SampleAuxiliaryInformationSizesBox 'saiz' and SampleAuxiliaryInformationOffsetsBox 'saio'. Define new aux_info_type and aux_info_type_parameter that identify the auxiliary data. The auxiliary sample data identified by new aux_info_type and aux_info_type_parameter would provide information on to which sample in the track a JSON patch document should be applied. The samples that contain glTF JSON document would have sample_info_size of SampleAuxiliaryInformationSizesBox equal to zero to indicate that those samples do not have associated auxiliary information. The auxiliary data contains sample_diff that indicates the sample number of the sample that shall be updated using JSON patch document.

```
class GlTFUpdateSampleAuxilaryInfo ( ){
   unsigned int(32) sample_diff;
}
sample_diff is an integer that gives the difference between the
sample number to be updated and the sample that contains the
sample_diff.
    - Define a new GLTFUpdateConfigBox 'gluC'
class GLTFUpdateConfigBox( ) extends Fullbox ('gluC', 0, 0) {
   unsigned int(1) update_mode;
}
``` update_mode has the same definition as described above. GLTFUpdateConfigBox may be present in SimpleTextSampleEntry with 4CC code 'stxt' when the MIME format field application/json-patch+json or model/gltf+json and the file brand is 'gltf'.

A content producer may split a scene to a multiple objects and still create one track to carry them. For that purpose a sub-sample definition is specified that provide information how to access and identify the sub-sample in a sample of a track.

In an embodiment, an object-based sub-sample is defined. An object-based sub-sample contains a JSON patch update for the defined object.

Figure 8:
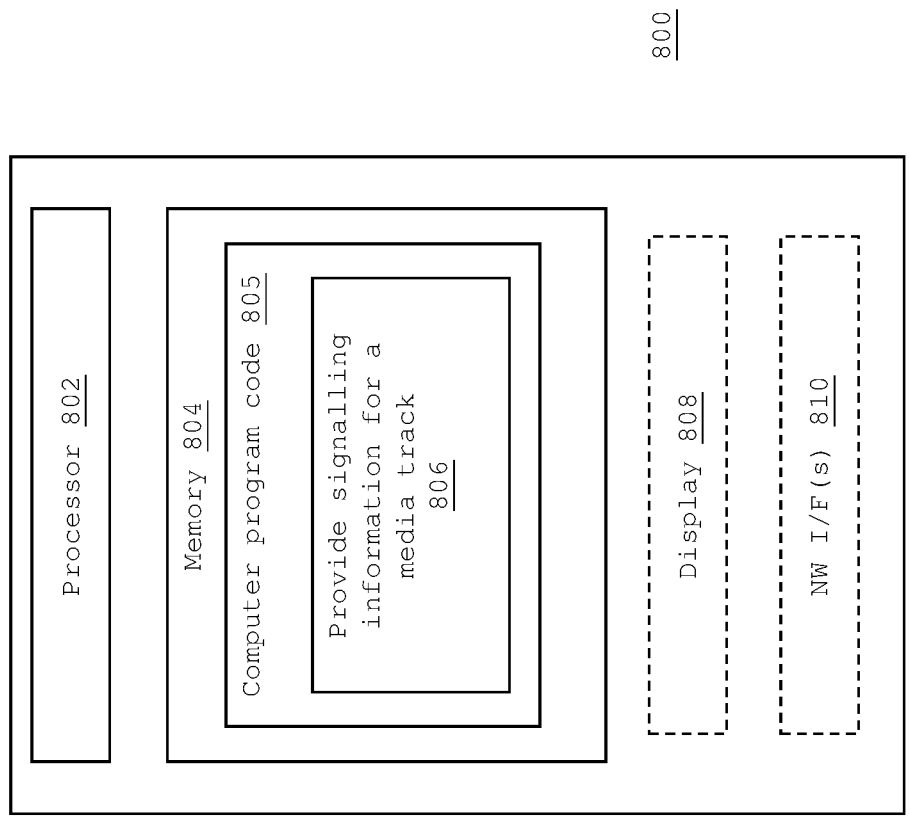
FIG. 8 is an example apparatus, which may be implemented in hardware, configured to provide signaling information for a media track, in accordance with an embodiment.

FIG. 8 is an example apparatus 800, which may be implemented in hardware, configured to provide signaling information for a media track, in accordance with an embodiment. In an embodiment, the media track comprises an ISOBMFF track. The apparatus 800 comprises at least one processor 802, at least one non-transitory memory 804 including computer program code 805, wherein the at least one memory 804 and the computer program code 805 are configured to, with the at least one processor 802, cause the apparatus to provide signaling information for a media track 806 based on the examples described herein. In an embodiment, the signaling information comprises information that allows to differentiate between samples of the track that includes description documents and patch documents. In another embodiment, the signaling information comprises information that allows to indicate to which samples of a media track a patch document should be applied to. In an embodiment, a patch document may be applied to another patch document which are finally applied to the glTF JSON document. In yet another embodiment, the signaling information comprises information that allows to include more than one document or patch document in a sample. In an embodiment, the description document includes a glTF JSON document and the patch document includes a JSON patch document.

The apparatus 800 optionally includes a display 808 that may be used to display content during rendering. The apparatus 800 optionally includes one or more network (NW) interfaces (I/F(s)) 180. The NW I/F(s) 810 may be wired and/or wireless and communicate over the Internet/other network(s) via any communication technique. The NW I/F(s) 810 may comprise one or more transmitters and one or more receivers. The N/W I/F(s) 810 may comprise standard well-known components such as an amplifier, filter, frequency-converter, (de)modulator, and encoder/decoder circuitry(ies) and one or more antennas.

The apparatus 800 may be a remote, virtual or cloud apparatus. The apparatus 800 may be either a coder or a decoder, or both a coder and a decoder. The at least one memory 804 may be implemented using any suitable data storage technology, such as semiconductor based memory devices, flash memory, magnetic memory devices and systems, optical memory devices and systems, fixed memory, and removable memory. The at least one memory 804 may comprise a database for storing data. The apparatus 800 need not comprise each of the features mentioned, or may comprise other features as well. The apparatus 800 may correspond to or be another embodiment of the apparatus 50 shown in FIG. 1 and FIG. 2, or any of the apparatuses shown in FIG. 3. The apparatus 800 may correspond to or be another embodiment of the apparatuses shown in FIG. 12, including UE 80, RAN node 170, or network element(s) 190.

Figure 9:
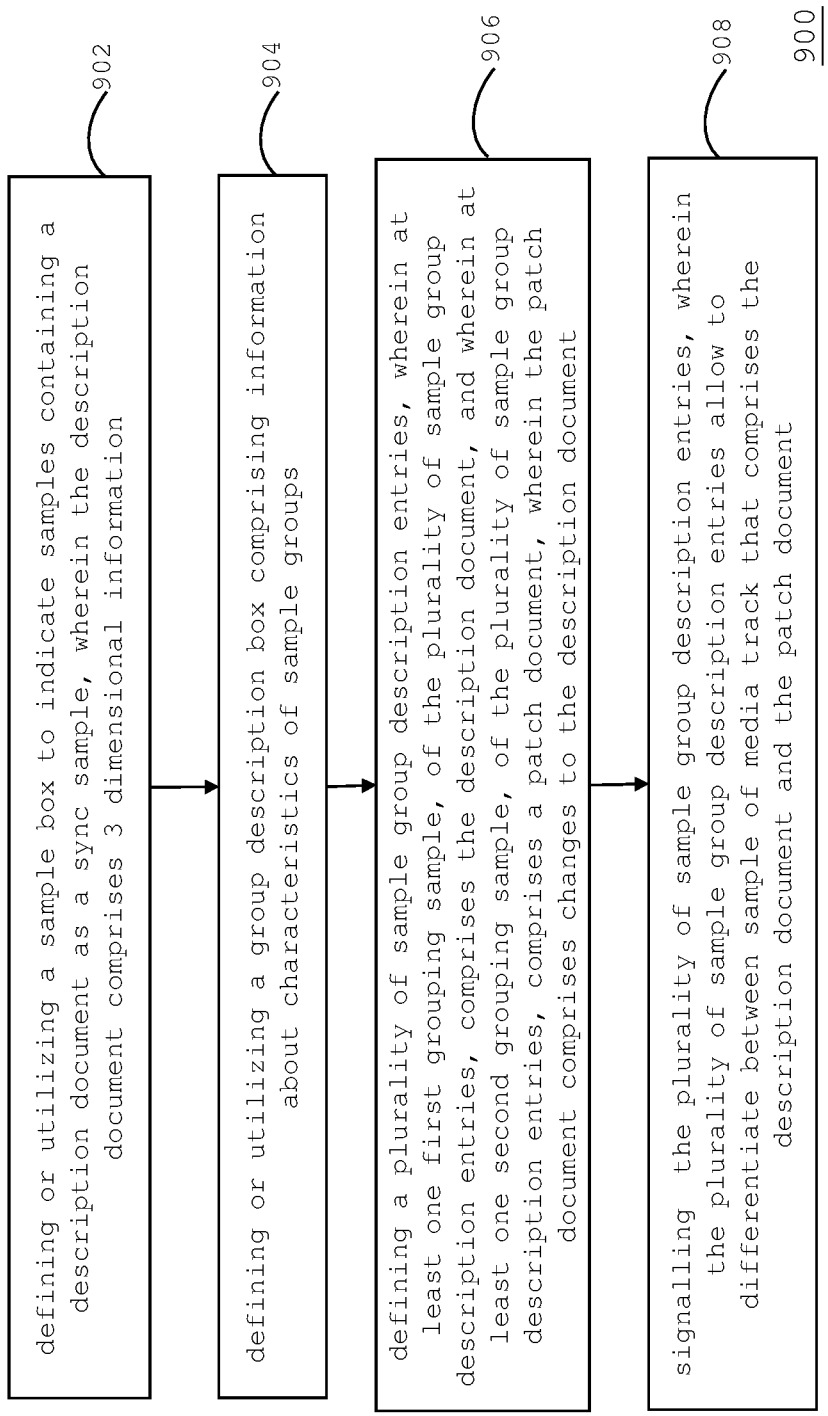
FIG. 9 illustrates an example method for providing signaling information that allows to differentiate between samples of a media track that contain description document or a patch document, in accordance with an embodiment.

FIG. 9 illustrates an example method 900 for providing signaling information that allows to differentiate between samples of a media track that contain description document or a patch document, in accordance with an embodiment. At 902, the method 900 includes defining or utilizing a sample box, e.g. a SyncSampleBox, to indicate samples containing a description document as a sync sample, where the description document comprises 3 dimensional information. At 904, the method 900 includes defining or utilizing a group description box comprising information about characteristics of sample groups. At 906, the method 900 includes defining a plurality of sample group description entries, where at least one first grouping sample, of the plurality of sample group description entries, comprises the description document, and where at least one second grouping sample, of the plurality of sample group description entries, comprises a patch document, where the patch document comprises changes to the description document. At 908, the method 900 includes signalling the plurality of sample group description entries, where the plurality of sample group description entries allow to differentiate between sample of media track that comprises the description document and the patch document.

In an embodiment, the description document includes a glTF JSON document, the patch document includes a JSON patch document, and the media track includes a ISOBMFF track.

Figure 10:
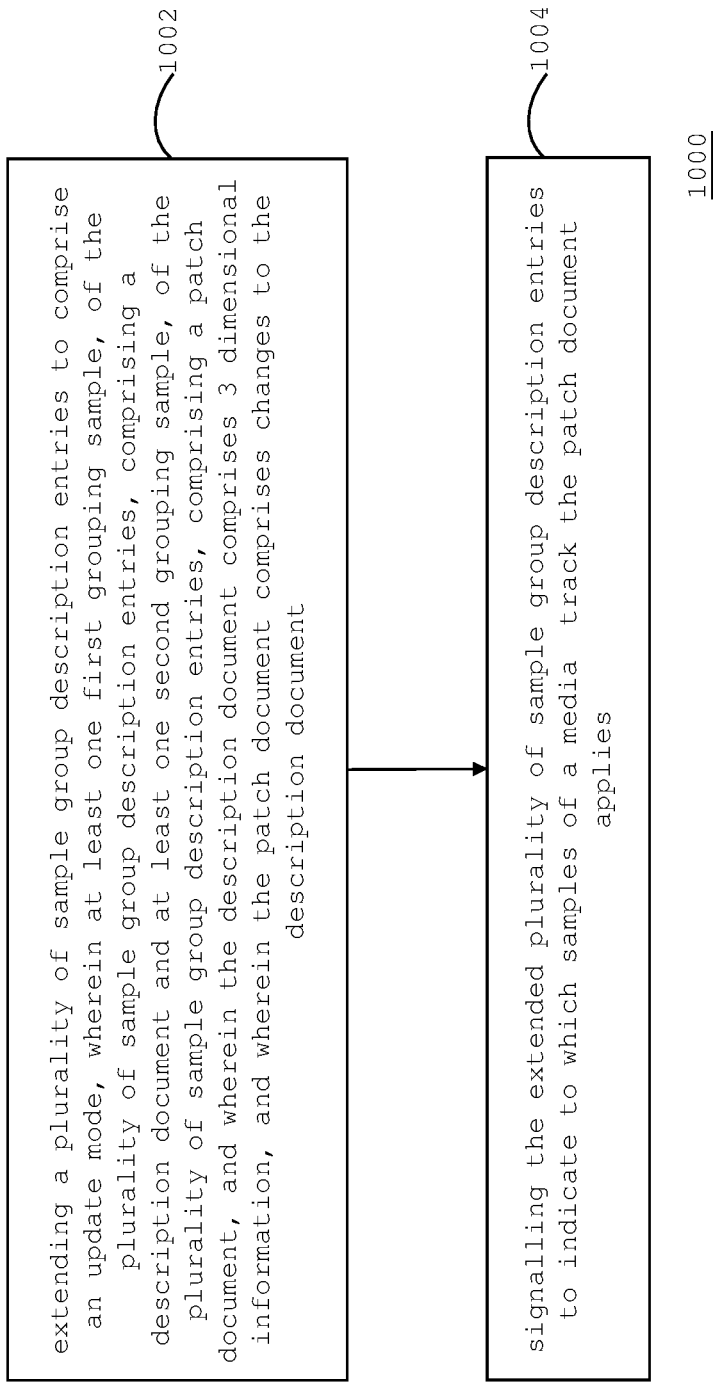
FIG. 10 illustrates an example method for providing signaling information that allows to indicate which samples of a media track a patch document applies, in accordance with an embodiment.

FIG. 10 illustrates an example method 1000 for signaling information that allows to indicate which samples of a media track a patch document applies, in accordance with an embodiment. At 1002, the method 1000 includes extending a plurality of sample group description entries to comprise an update mode, where at least one first grouping sample, of the plurality of sample group description entries, includes a description document and at least one second grouping sample, of the plurality of sample group description entries, includes a patch document. The description document comprises 3 dimensional information, and the patch document comprises changes to the description document. In an embodiment, the method 1000 may include defining the update mode, where the update mode indicates how a sample updates a scene, where an update of a sample is associated with latest sync sample in decoding order when the update mode is set to '0', and the update of the sample is associated with latest sample in a decoding order when the update mode is set to '1'. In an embodiment, an update of the sample is associated with a latest sample in a decoding order when the update mode is set to '0', and wherein the update to a sample is associated with latest sync sample in decoding order when the update mode is set to '1'. At 1004, the method 1000 includes signaling the extended plurality of sample group description entries to indicate to which samples of the media track the patch document applies.

In an embodiment, the method 1000 may further include defining an auxiliary information type and an auxiliary information type parameter to identify an auxiliary sample data, where the auxiliary sample data identified by the auxiliary information type and auxiliary information parameter provides information on to which sample in the media track the patch document is applied.

In an embodiment, the method 1000 may further include defining a configuration box, where a sample entry includes the configuration box when the media file brand comprises a graphics language transmission format (gltf).

In an embodiment, the description document includes a gITF JSON document, the patch document includes a JSON patch document, and the media track includes a ISOBMFF track.

Figure 11:
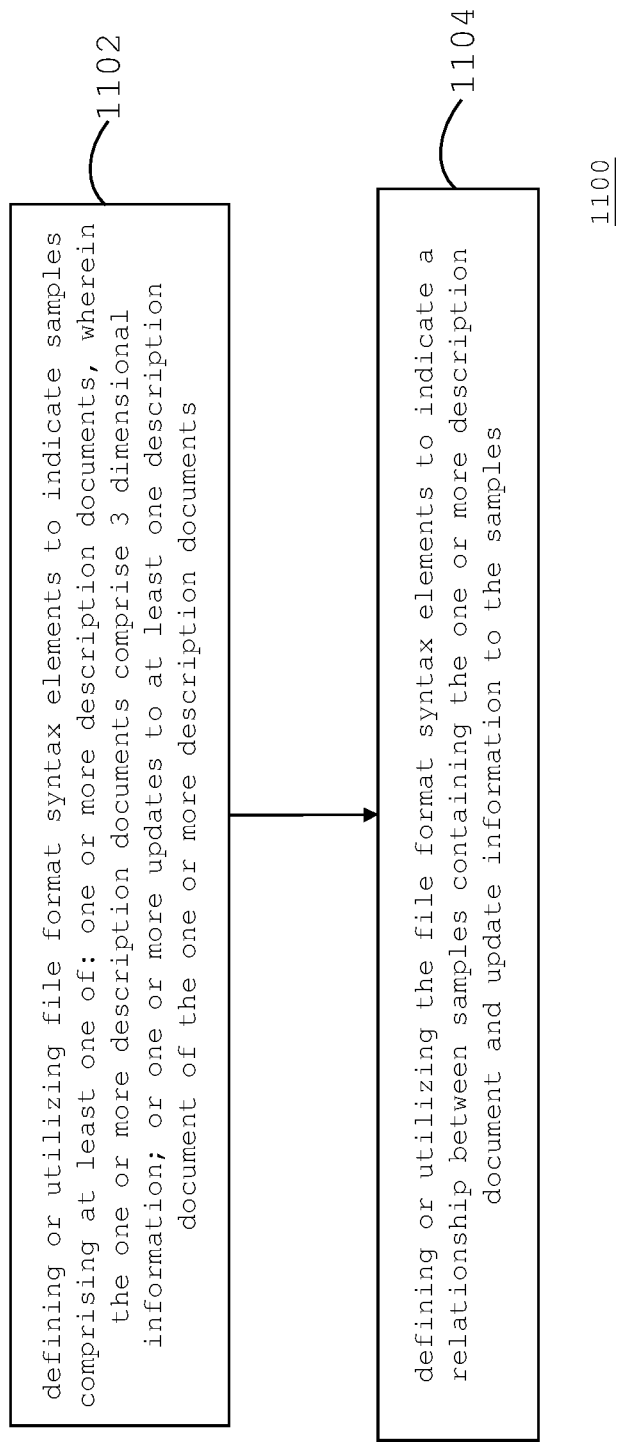
FIG. 11 illustrates an example method for signaling information of a media track, in accordance with an embodiment.

FIG. 11 illustrates an example method 1100 for signaling information of a media track, in accordance with an embodiment. At 1102, the method 1100 includes defining or utilizing file format syntax elements to indicate samples comprising at least one of: one or more description documents, wherein the one or more description documents comprise 3 dimensional information; or one or more updates to at least one description document of the one or more description documents. At step 1104 the method includes defining or utilizing the file format syntax elements to indicate a relationship between samples containing the one or more description document and update information to the samples.

In an embodiment, the description document includes a gITF JSON document, the patch document includes a JSON patch document, and the media track includes a ISOBMFF track.

In another embodiment, the 3 dimensional information describes a 3 dimensional scene or comprises a 3 dimensional scene information.

Figure 12:
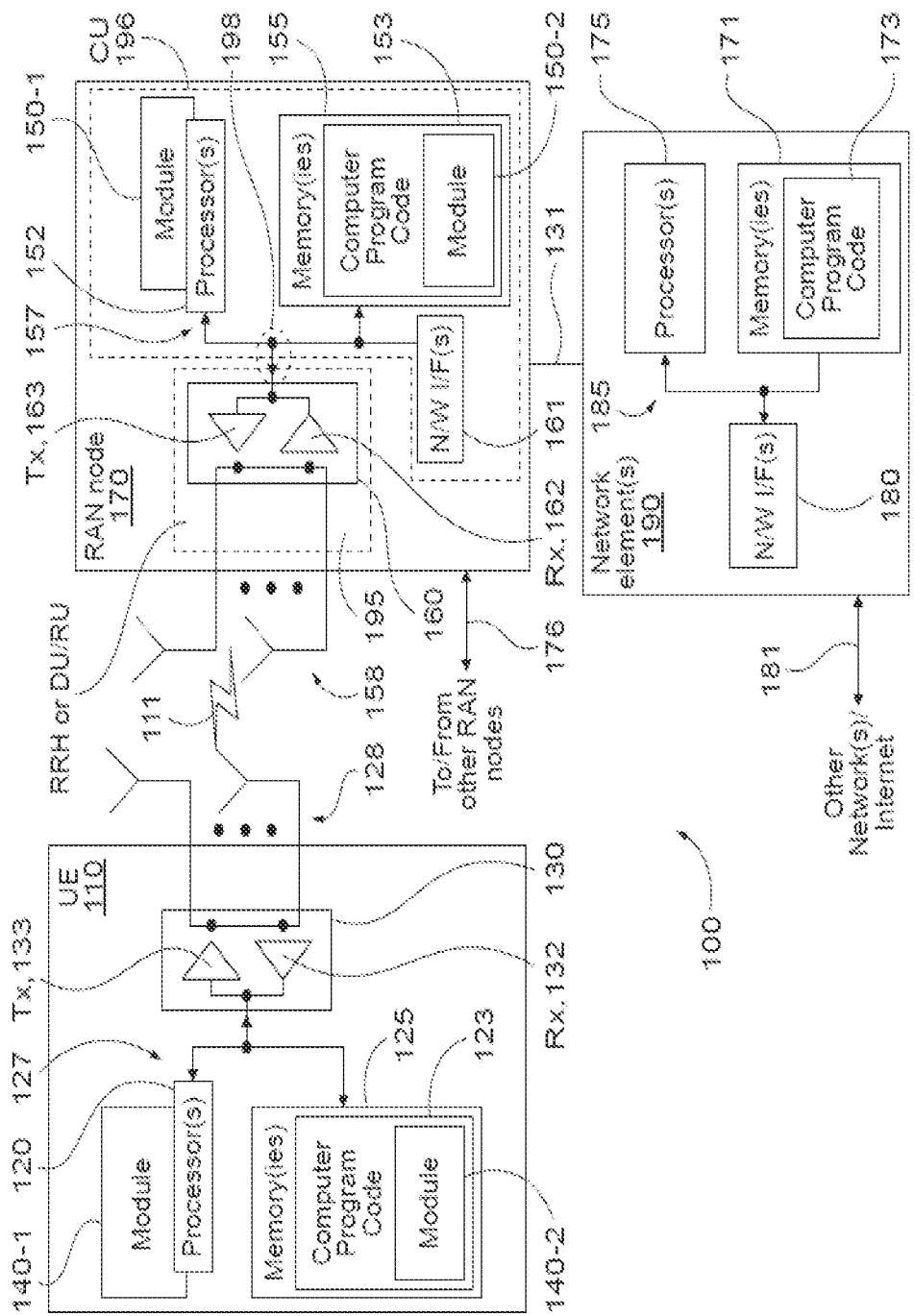
FIG. 12 is a block diagram of one possible and non-limiting system in which the example embodiments may be practiced.

Referring to FIG. 12, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that 'cells' perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to provide signaling information for a media track. Computer program code 173 may also be configured to implement provide signaling information for a media track.

As described above, FIGS. 9, 10, and 11 include flowcharts of an apparatus (e.g. 50, 402, 404, 500, and 800), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 504, or 804) of an apparatus employing an embodiment of the present invention and executed by processing circuitry (e.g. 56, 120, 502, or 802) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIGS. 9, 10, and 11. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

In the above, some embodiments have been described in relation to a particular type of a parameter set (namely adaptation parameter set). It needs to be understood, however, that embodiments could be realized with any type of parameter set or other syntax structure in the bitstream.

In the above, some example embodiments have been described with the help of syntax of the bitstream. It needs to be understood, however, that the corresponding structure and/or computer program may reside at the encoder for generating the bitstream and/or at the decoder for decoding the bitstream.

In the above, where example embodiments have been described with reference to an encoder, it needs to be understood that the resulting bitstream and the decoder have corresponding elements in them. Likewise, where example embodiments have been described with reference to a decoder, it needs to be understood that the encoder has structure and/or computer program for generating the bitstream to be decoded by the decoder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, and the like.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

What is claimed is:

1. An apparatus comprising:
   at least one processor; and
   at least one non-transitory memory including computer program code;
   wherein the at least one memory and the computer program code are configured to, with the at least one processor, cause the apparatus at least to perform:
      define or utilize file format syntax elements to indicate samples, wherein at least one sample of the samples comprises one or more description documents, wherein the one or more description documents comprise three dimensional information, and wherein at least another of the samples comprises one or more updates to at least one description document of the one or more description documents;
      define or utilize the file format syntax elements to indicate a relationship between the at least one sample comprising the one or more description documents and the at least another sample comprising the one or more updates; and
      define an update mode in a sample entry, wherein the update mode indicates how a sample is configured to update a scene, and wherein an update of the sample is associated with a latest sample in a decoding order when the update mode is set to zero, and wherein the update to the sample is associated with a latest sync sample in the decoding order when the update mode is set to one.

2. The apparatus of claim 1, wherein the relationship indicates the at least one description document to which the one or more updates are to be applied.

3. The apparatus of claim 1, wherein the apparatus is further caused to:
   mark the at least one sample comprising the one or more description documents as a sync sample; and
   mark the at least another sample comprising the one or more updates and no description documents as a non sync sample.

4. The apparatus of claim 1, wherein the apparatus is further caused to define a configuration box, and wherein a sample entry comprises the configuration box when the media file brand comprises a graphics language transmission format.

5. The apparatus of claim 1, wherein a media track comprises the samples, and wherein the media track comprises an ISOBMFF media track.

6. The apparatus claim 1, wherein the at least one description document comprises a graphics language transmission format.

7. The apparatus claim 1, wherein a patch document comprises the one or more updates to the at least one description document of the one or more description documents, and wherein the patch document comprises a java script object notation patch document.

8. A method comprising:
   defining or utilizing file format syntax elements to indicate samples, wherein at least one of the samples comprises one or more description documents, wherein the one or more description documents comprise three dimensional information, and wherein at least another of the samples comprises one or more updates to at least one description document of the one or more description documents;
   defining or utilizing the file format syntax elements to indicate a relationship between the at least one sample comprising the one or more description documents and the at least another sample comprising the one or more updates; and
   defining an update mode in a sample entry, wherein the update mode indicates how a sample is configured to update a scene, and wherein an update of the sample is associated with a latest sample in a decoding order when the update mode is set to zero, and wherein the update to the sample is associated with a latest sync sample in the decoding order when the update mode is set to one.

9. The method of claim 8, wherein the relationship indicates the at least one description document to which the one or more updates are to be applied.

10. The method of claim 8 further comprising:
    marking the at least one sample comprising the one or more description documents as a sync sample; and
    marking the at least another sample comprising the one or more updates and no description documents as a non sync sample.

11. The method of claim 8 further comprising defining a configuration box, and wherein a sample entry comprises the configuration box when the media file brand comprises a graphics language transmission format.

12. The method of claim 8, wherein a media track comprises the samples, and wherein the media track comprises an ISOBMFF media track.

13. The method of claim 8, wherein the at least one description document comprises a graphics language transmission format.

14. The method of claim 8, wherein the patch document comprises the one or more updates to the at least one description document of the one or more description documents, and wherein the patch document comprises a javascript object notation patch document.

15. A non-transitory computer readable medium comprising program instructions for causing an apparatus to perform at least the following:
    defining or utilizing file format syntax elements to indicate samples, wherein the at least one of the samples comprises one or more description documents, wherein the one or more description documents comprise three dimensional information, and wherein at least another of the samples comprises one or more updates to at least one description document of the one or more description documents;

defining or utilizing the file format syntax elements to indicate a relationship between the at least one sample comprising one the or more description documents and the at least another sample comprising the one or more updates; and defining an update mode in a sample entry, wherein the update mode indicates how a sample is configured to update a scene, and wherein an update of the sample is associated with a latest sample in a decoding order when the update mode is set to zero, and wherein the update to the sample is associated with a latest sync sample in the decoding order when the update mode is set to one.

16. The computer readable medium of claim 15, wherein the relationship indicates the at least one description document to which the one or more updates are to be applied.

17. The computer readable medium of claim 15, wherein the apparatus is further caused to:

mark the at least one sample comprising the one or more description documents as a sync sample; and mark the at least another sample comprising the one or more updates and no description documents as a non sync sample.

* * * * *